United States Patent
Logsdon

[15] 3,684,223
[45] Aug. 15, 1972

[54] PIPE CLAMP
[72] Inventor: Duane D. Logsdon, 1719 Canyon Rd., Fullerton, Calif. 92633
[22] Filed: Oct. 20, 1970
[21] Appl. No.: 82,352

[52] U.S. Cl. ................. 248/74, 24/257, 24/73 SA
[51] Int. Cl. .................................... A44b 21/00
[58] Field of Search ....... 24/257, 243 AE, 243 AC, 73 SA, 24/73 P, 73 PB; 248/74 A, 74 PB, 74 B, 350, 62, 74, 358, 54; 138/106

[56] References Cited

UNITED STATES PATENTS

| 3,266,761 | 8/1966 | Walton | 248/74 B |
| 3,113,363 | 12/1963 | Fyvie | 24/257 |
| 3,128,073 | 4/1964 | Berlyn | 248/62 |
| 3,161,407 | 12/1964 | Robin | 248/358 |
| 3,203,653 | 8/1965 | Hall | 248/54 |
| 3,531,068 | 9/1970 | Fischer | 248/358 |

FOREIGN PATENTS OR APPLICATIONS

| 592,661 | 5/1959 | Italy | 248/358 |

Primary Examiner—Bernard A. Gelak
Attorney—Edward D. O'Brien

[57] ABSTRACT

A pipe clamp for holding a pipe so as to isolate sound, prevent electrolysis and minimize heat transmission while avoiding pipe rupture and yet permitting pipe expansion and contraction can be formed of a single body of a resilient polymer material. This body includes a slotted cylindrical center section having ridges extending towards its interior and attaching flanges with ribbed lower surfaces, these flanges extending from the center section on opposite sides of the slot in the center section.

1 Claim, 4 Drawing Figures

PATENTED AUG 15 1972  3,684,223

INVENTOR
DUANE D. LOGSDON
BY
EDWARD D. O'BRIAN
ATTORNEY

PIPE CLAMP

BACKGROUND OF THE INVENTION

A large number of different pipe clamps have been developed in the past. Such clamps have engaged or held pipes in various manners and have been mounted in different ways. They have been constructed of various different materials. In spite of the diversity in such prior pipe clamp structures it is considered that no prior pipe clamp is capable of satisfactorily fulfilling an existent need in the plumbing field.

This need is related to changes in plumbing and building practice. The reasons for these changes are unimportant to the present invention. At this time increasingly comparatively thin walled copper or copper alloy type tubing or pipe is being utilized for hot water lines in various types of buildings. Such tubing or pipe is also used for cold water lines, but at this time it is considered that such use is becoming less and less significant because of the availability and cost of satisfactory plastic pipe for use in conveying cold water. Such copper pipe is being commonly installed on studs and related members used above a foundation or slab in walls.

Such use of comparatively thin walled copper pipe is unquestionably advantageous from various different standpoints. However, such use has also given rise to certain problems. As tubing as indicated is used as described in the preceeding discussion not infrequently sound from the pipe will tend to be conducted from the pipe itself through the materials contacted by it to within the walls of various rooms. This is of course somewhat objectionable.

Also there is danger of galvanic action setting in and causing corrosion if such pipes should contact various dissimilar metals such as are used in conventional fasteners such as nails in a building. The possibility of this should of course be avoided so as to avoid the possibility of ultimate pipe replacement. Further, as used copper tubing or pipe is frequently employed where it can convey heat by conduction to various parts of a building. Although this might not be objectionable on a cold winter day it can be disconcerting during hot weather.

These problems in utilizing copper tubing or the like in hot water systems have also been accompanied by other problems which are to a large degree related to one another. For economic reasons such tubing or pipe as used should be as thin as reasonably possible. The thinner it gets the more danger there is of such a pipe or tube rupturing as a result of the way it is mounted and used. This is particularly the case with hot water lines formed out of such tubing since such lines tend to expand and contract a significant amount as they are heated and cooled depending upon the operation and use of a hot water system. Frequently prior pipe clamps have not firmly held tubing or pipe as indicated in such a manner as to accomodate pipe movement or in such a manner as to permit expansion and contraction.

SUMMARY OF THE INVENTION

A broad objective of the present invention is to provide a new and improved pipe clamp. More specifically an objective of this invention is to provide a pipe clamp to fulfill the existent need in the plumbing field for a pipe clamp which can be satisfactorily utilized to solve the problems which have been encountered with existent pipe clamps in mounting copper and similar tubing or pipe used for conveying hot water. A related and yet generalized important objective of the present invention is to provide a pipe clamp for the purposes described which is realtively inexpensive and easy to manufacture. It is hardly thought that this latter objective needs an explanation since costs are of primary importance in the construction industry.

In accordance with this invention the various objectives indicated in the preceeding are met by forming a pipe clamp of a single body of a resilient, polymer material such as a polyolefin. Such a body may be conveniently and easily formed at a nominal cost by present-day high speed injection molding techniques. As formed it should include a slotted cylindrical center section having ridges extending towards its interior and attaching flanges with ribbed lower surfaces, these flanges extending from the center section on opposite sides of the slot in the center section.

BRIEF DESCRIPTION OF THE DRAWING

The use of such a pipe clamp structure as indicated in the preceeding and the various advantages flowing from such use are best explained with reference to the accompanying drawing in which.

The accompanying drawing is primarily intended for explanatory purposes. It is not intended to show an actual pipe clamp of this invention drawn to scale. It will be realized that various minor changes may be made in the precise pipe clamp illustrated without departing from the essential features or principles of the invention as set forth in the appended claims.

DETAILED DESCRIPTION OF THE PREFERRED EMBODIMENT

Figure 1:
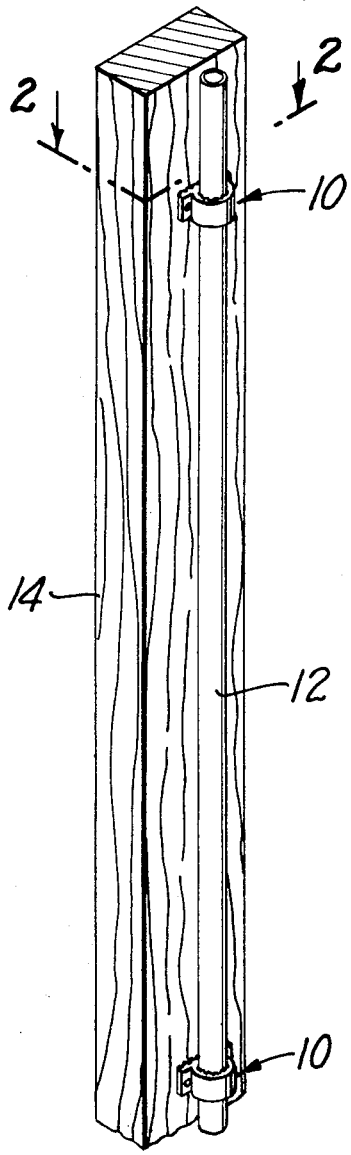
FIG. 1 is an isometric view illustrating one manner of use of a presently preferred embodiment or form of a pipe clamp in accordance with this invention.
Figure 2:
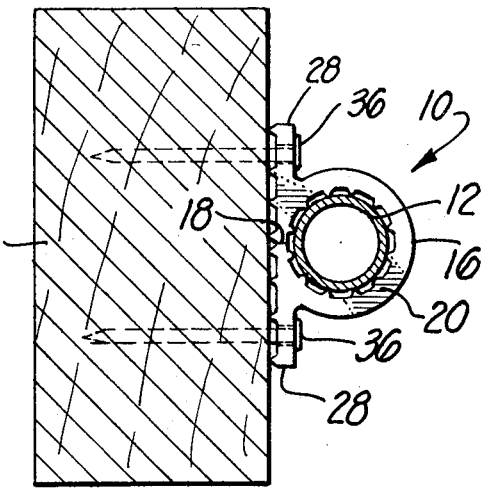
FIG. 2 is a cross-sectional view taken at line 2—2 of FIG. 1.
Figure 3:
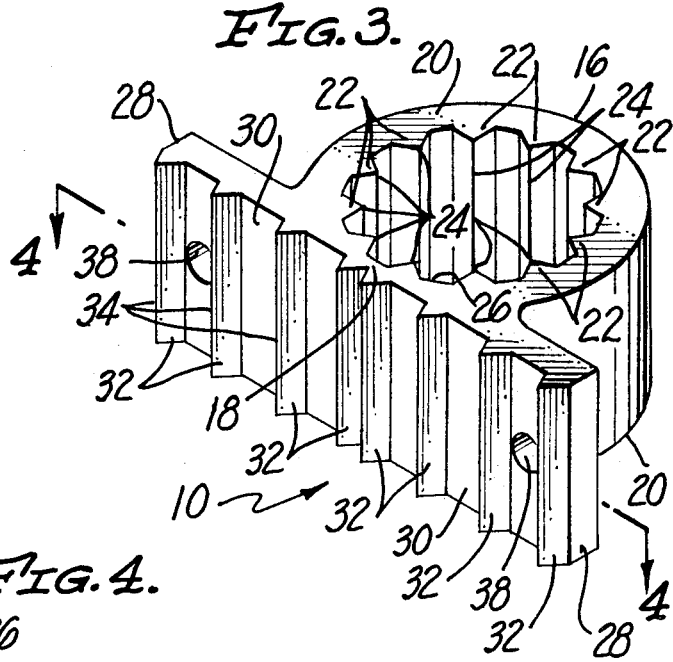
FIG. 3 is an isometric view of the pipe clamp shown in the preceeding figures.
Figure 4:
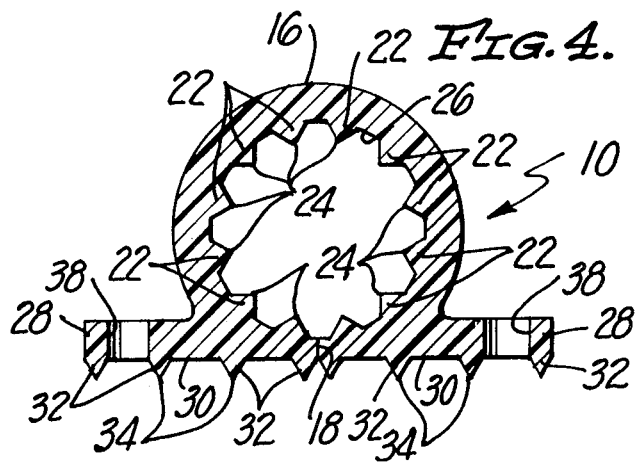
FIG. 4 is a cross-sectional view taken at line 4—4 of FIG. 3.

In FIG. 1 of the drawing there are shown two identical pipe clamps 10 of the present invention utilized in holding a comparatively thin walled copper or similar tubing or pipe 12 in place upon a conventional building stud 14. Normally the pipe 12 will be part of a hot water system. It is not to be assumed from FIG. 1 that pipe clamps 10 in accordance with this invention are only to be utilized in holding a pipe 12 in a vertical manner. It is believed that such pipe clamps 10 will be primarily utilized in holding pipes such as the pipe 12 horizontally in substantially the same manner as the pipe 12 is held in FIG. 1.

A pipe clamp 10 of the present invention is preferably formed as a unitary body of a polyolefin material such as polypropylene by present-day injection molding techniques. Polypropylene and related polyolefins are considered satisfactory for use in forming the pipe clamp 10 since such materials do not melt or soften to any significant degree at the temperatures normally encountered in any hot water system, i.e., a temperature of 212°F. or less. Such materials are also considered suitable for the present invention because they are resilient in character.

Because of such resiliency a pipe clamp 10 of the present invention can be bent substantially like a spring away from its initial configuration or shape and yet will return to such a configuration or shape after force or pressure is no longer applied to it. This action should be contrasted with the action of an elastomer. Such a rubber-like material will continuously stretch and will be subjected to numerous degradation type problems which are well recognized in the polymer industry.

As formed the pipe clamp 10 includes a cylindrical center section 16 having a slit 18 through its bottom. It will be noted that this slit 18 extends between the ends 20 of the section 16. The center section 16 is also provided with internal, equally spaced, parallel ridges 22 which extend parallel to the axis of the section 16 between its ends 20. Preferably these ridges 22 are of a triangular cross-sectional configuration and have pointed extremities 24 directed towards the axis of the section 16 located equidistant from this axis.

These extremities 24 are dimensioned so as to firmly and frictionally grip the exterior of a pipe such as the pipe 12 so as to firmly hold this pipe 12 against movement so that the pipe itself is spaced from the interior 26 of the section 16. A plurality of the ridges 22 should be used so as to obtain a firm holding action. Although at least in theory only three of the ridges 22 would achieve a holding action against a pipe such as the pipe 12 it is preferred to use a greater number of ridges so as to make sure that a pipe is adequately supported.

The clamp 10 also includes two attaching flanges 28 located on the center section 16 adjacent to the slit 18. It will be noted that one of these flanges 28 is located on one side of the slit 18 while the other is located on the other side. These flanges 28 are aligned with one another and have bottom surfaces 30 lying in the same plane. A plurality of parallel ribs 32 are located on these bottom surfaces 30 so as to extend therefrom the same distance. These ribs 32 are preferably the same as the ridges 22. To avoid confusion the ridges 22 and the ribs 32 are designated herein by different terms even though they may be the same. These ribs 32 also have pointed extremities 34 which are parallel to one another and which are spaced from one another.

In the use of a pipe clamp 10 a pipe such as the pipe 12 is located substantially where it is desired to mount such a pipe. Then pressure is applied to the flanges 28 and to the center section 16 so as to open up the interior of the center section 16 along the slit 18. At this point the pipe clamp 10 may be placed over a pipe 12. Then when the pressure is released because of its resiliency the clamp 10 will return to its initial configuration. At this point nails 36 may be inserted through holes 38 in the flanges 28 so as to mount the clamp 10. Because these holes 38 are located remote from the center section 16 there is substantially no danger of the clamp 10 being hit by a hammer during the installation of such nails 36 in such a manner as to cause damage.

However, even if during operation a glancing blow should strike the center section 16 the inherent properties of a polyolefin material as described will tend to absorb such a blow so as to prevent physical damage. This is particularly the case because of the use of the ridges 22 and the fact that such ridges 22 will readily deform to minor extents if force is applied to the center section 16 so as to bring them in contact with a pipe such as the pipe 12.

When a pipe clamp 10 is used in accordance with this invention it will support a pipe such as the pipe 12 so that there is no danger of electrolysis occurring between a fastening and this pipe. It will also hold the pipe in such a manner that an air space is provided around the pipe between the ridges 22 which will effectively minimize the conduction of heat. Indeed, this action is so effective that it is considered that the pipe clamp 10 of the present invention can be satisfactorily employed for this purpose with even low pressure steam lines. In addition, however, a pipe such as the pipe 12 will be supported so that sound cannot be transmitted from it to a building by conduction to any significant extent. The ridges 22 will support such a pipe 12 so that it is firmly held in such a manner that there is little area available for either heat or sound conduction and because of its physical properties the material within the clamp 10 will tend to absorb sound.

Further because of the ribs 32 operating in substantially the same way as the ridges 22 substantially no sound vibration will be transmitted to a mounting such as the stud 14 even though such ribs 32 will engage such a mounting to firmly hold a clamp 10 in place.

An important aspect of the present invention relates to the manner in which the clamp 10 permits temperature caused expansion and contraction without pipe damage. If a pipe such such as the pipe 12 held by a clamp such as the clamp 10 should expand significantly in diameter the ridges 22 will tend to deform and flex so as to accomodate this change of dimension. These ridges 22 normally hold the pipe sufficiently resiliently to also still hold a pipe firmly if it should decrease in dimension. Because of their orientation these ridges 22 also permit linear changes in dimension without pipe damage.

I claim:

1. A pipe clamp formed as a unitary body of a resilient polymer material, said body including:
   a central cylindrical section having a slit therein, said slit extending the length of said section,
   a plurality of spaced, parallel, projecting flexible ridges located in the interior of said section so as to extend towards the axis of said section, said ridges extending the length of said section,
   the extremities of said ridges adjacent to the axis of said section being located equidistant from the axis of said section,
   the extremities of said ridges adjacent to the axis of said section having generally sharp edges and being capable of engaging the exterior of a pipe for minimal contact so as to hold such a pipe passing through said section,
   a pair of attaching flanges located on said center section adjacent to said slit, one of said flanges being located on one side of said slit and the other of said flanges being located on the other side of said slit,
   said flanges being aligned with one another and having bottom surfaces lying in the same plane,
   a plurality of flexible rib means for engaging a support for said pipe clamp so as to aid in holding said pipe clamp with respect to the support located on said bottom surfaces so as to extend therefrom and having generally sharp edges for minimal contact with said support, said ridges and ribs adapted to minimize heat and sound conduction and permit pipe expansion and contraction, said body being capable of being temporarily deformed so that said center section can be opened along said slit for the insertion of a pipe into said center section and being sufficiently resilient to resume its initial configuration after such insertion of a pipe, and said flanges each having a hole to accomodate a fastener located therein remote from said section, said holes extending through said flanges.

* * * * *